Figure 1:
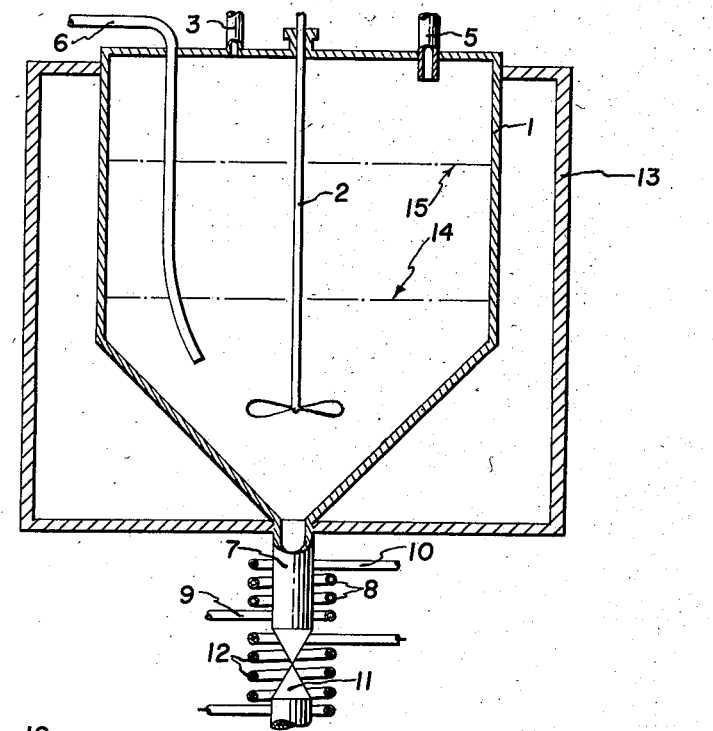
Figure 2:
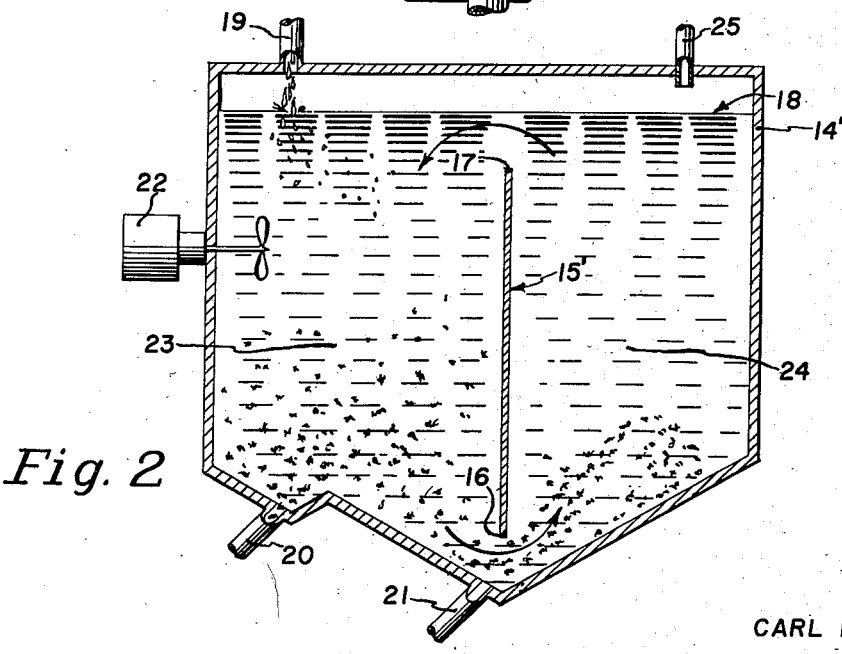

June 17, 1958 — C. M. OLSON — 2,839,385
METHOD OF PRODUCING TITANIUM METAL
Filed Dec. 8, 1954

INVENTOR
CARL M. OLSON
BY
ATTORNEY

United States Patent Office 2,839,385
Patented June 17, 1958

2,839,385

METHOD OF PRODUCING TITANIUM METAL

Carl Marcus Olson, Kennett Square, Pa., assignor to E. I. du Pont de Nemours and Company, Wilmington, Del., a corporation of Delaware Application December 8, 1954, Serial No. 473,905

3 Claims. (Cl. 75—84.5)

This invention relates to titanium metal preparation and more particularly to the production of particulate titanium metal by sequential reactions of titanium tetrachloride and magnesium metal.

Present commercial processes for the preparation of titanium metal produce, in the reaction, a dense sponge-like metal which objectionably adheres to the reaction mass container. The removal of such sponge metal requires removal of the product mass from the reaction vessel by a machining operation or by the destruction of the container itself. The metal product, when produced in massive sponge form, must be broken up by an intensive crushing, grinding or milling operation before it is suitable for utilization with present melting techniques.

In such prior processes, titanium tetrachloride is reacted with molten magnesium and control of the temperature of reaction is very difficult to effect. The reaction temperature must be limited to that region below which alloying of the metal product with the metals of the reaction vessel will take place. This requires that fairly small size reactor units be utilized in the process. Limited control over the area at which reaction is occurring is attainable with these methods but heat transfer becomes quite difficult when the reactor size is increased. Furthermore, the sponge characteristics are difficult to control which renders the purification operations of drainage and vaporization of the by-product magnesium chloride more difficult.

It is among the objects of this invention to overcome the above and other disadvantages of prior titanium metal-producing processes and to provide novel and effective methods for attaining such objects. It is among the particular objects of this invention to provide a novel process wherein titanium tetrachloride and magnesium metal are reacted in sequential reactions to produce particulate titanium metal; to provide a novel method wherein control of the thermal energy evolved in the various reactions is readily achieved and from which a metal product is produced which is adapted to be easily handled in the subsequent discharging and purification steps; and to provide a novel and useful process in which good mixing of reactants and large areas of contact between reactants is readily achieved. Further objects and advantages will become apparent from the ensuing description of the invention and from the accompanying drawings, wherein Fig. I is a cross-sectional side elevational view of one form of apparatus for carrying out the invention in a batch type of operation; while Fig. II is a side elevational, cross sectional view of another form of apparatus in which the invention can be carried out continuously.

These and other objects are realized by this invention which comprises the sequential reactions of oxidizing particulate titanium metal while suspended in molten magnesium chloride with titanium tetrachloride to produce a titanium subchloride, having a chloride to titanium atomic ratio between 2 and 3 inclusive, associated with molten magnesium chloride, reducing the resulting titanium subchloride with particulate magnesium metal to produce particulate titanium metal and magnesium chloride by-product salt, removing a portion of the resulting products and recovering particulate titanium metal therefrom, and circulating the remainder of said products to the titanium subchloride preparation stage of the operation for continuance of the process.

The method of my invention requires that the following reactions be carried out in sequence: (1) titanium metal suspended in molten magnesium chloride is first oxidized by titanium tetrachloride to produce titanium subchlorides having a chlorine to titanium atomic ratio between 2 and 3 inclusive, (2) then the titanium subchloride is reduced by particulate magnesium to produce the desired titanium metal particles. These reactions involve the following chemical equations:

(1) 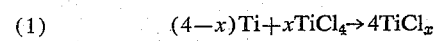
$$(4-x)\text{Ti} + x\text{TiCl}_4 \rightarrow 4\text{TiCl}_x$$

(2) 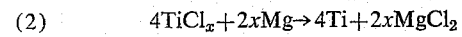
$$4\text{TiCl}_x + 2x\text{Mg} \rightarrow 4\text{Ti} + 2x\text{MgCl}_2$$

where $x = $ Cl/Ti atomic ratio in titanium subchloride and is between 2 and 3 inclusive, Metal product removed from system $= x\text{Ti}$,
Metal product recirculated in system $= (4-x)\text{Ti}$,
And reactions are carried out in presence of molten $\text{MgCl}_2$.

The titanium metal product removed from the reaction system together with molten magnesium chloride is conventionally separated as by draining or expressing, and some molten magnesium chloride can be recirculated to the system, with the magnesium chloride being used to carry in the magnesium reductant.

Referring to the drawings and particularly to Fig. I, there is shown a conical bottom type of closed reaction vessel 1, equipped with a paddle or other form of agitator 2, an inert gas inlet 3, a metal reductant inlet 5, a titanium tetrachloride reactant inlet 6, and a reaction product outlet or withdrawal duct 7 provided with a cooling coil 8 adapted to freeze a plug of solid material in outlet line 7 due to passage of a suitable cooling medium or refrigerant (not shown) through coil inlet 9 and outlet 10. A flow control valve 11 is fitted into the withdrawal conduit or duct 7 and is provided with a surrounding electrical or other desired form of heating element 12. The reaction vessel 1 is disposed within conventional furnacing means 13 equipped with suitable means (not shown) for controlling the temperature within the system within any desired range.

In the modification of apparatus shown in Fig. II wherein a continuous process under the invention can be effected, the reaction vessel 14' is also disposed within furnacing means (not shown), and is provided with a vertical baffle element 15' so disposed that its lowermost portion 16 is arranged short of the bottom of the conical reactor 14', while the uppermost portion 17 thereof extends below the level 18 of the reaction system maintained in said reactor. The reactor vessel is equipped with a magnesium reductant metal inlet nozzle 19, an outlet nozzle 20 to remove titanium and MgCl₂ products, a titanium tetrachloride inlet 21, and suitably powered agitating means 22. The baffle 15' separates the reaction vessel into two compartments, a section 23 wherein magnesium is reacted with the titanium subchloride to produce titanium metal, and a section 24 wherein titanium tetrachloride is reacted with titanium metal to produce titanium subchlorides. The agitator 22 serves to intimately mix the reductant metal and disperse it within the reaction system. The titanium tetrachloride inlet 21 serves as an injection system to circulate the molten salt from section 23 to section 24. If desired, this circulation can be effected by or in conjunction with an agitator (not shown). The titanium tetrachloride in this specific mode serves as an agitating means besides being a reactant. The titanium subchloride molten salt composition then flows from chamber section 24 over the upper part 17 of the baffle 15' and into the section 23 wherein reaction with magnesium takes place. Pressure release vent line 25 serves to protect unit from excessive pressure and to vent unit during start-ups.

To a clearer understanding of the invention the following specific examples are given. These are merely illustrative and not in limitation of my invention.

Example I

Employing the reaction vessel shown in Fig. I, such vessel was initially swept free of active gaseous materials (oxygen, water vapor and nitrogen) by purging with an inert gas (argon) admitted through line 3. During this initial period, the vessel was heated to about 800° C. by the furnacing means 13. A charge of molten magnesium chloride containing suspended granular titanium metal (weight ratio $1Ti/4MgCl_2$) was then added to the vessel and until the one-half level point 14 was reached. Cooling water was then charged through the inlet 9, coils 8 and outlet 10, to freeze a plug of magnesium chloride in the bottom conduit 7. The agitator 2 was then activated and the flow of titanium tetrachloride via line 6 was then started. The rate of titanium tetrachloride addition was regulated so as to maintain the pressure above the reaction space at slightly above atmospheric. The addition of titanium tetrachloride was terminated when the required amount (equimolar to the titanium metal) to convert the titanium metal to titanium dichloride in accordance with the following equation: $Ti+TiCl_4 \rightarrow 2TiCl_2$, had been added. After the completion of this step, magnesium was introduced via inlet 5 to obtain the reaction: $2TiCl_2+2Mg \rightarrow 2Ti+2MgCl_2$. The magnesium was added in equimolar quantity to the titanium dichloride reactant or in the ratio of 2 mols of magnesium for each mol of titanium tetrachloride originally added. The reaction temperature during this reduction step was regulated at about 750° C.–850° C. by controlling the amount of heat from the furnacing means and rate of Mg addition. After completion of the addition of magnesium and the subsequent reaction, the volume of product doubled the initial volume and reached the level 15. The next step was to drain out one-half of this volume, leaving the remaining one-half portion to start the cycle all over again. This was effected by melting the frozen plug of magnesium chloride in the outlet 7. Upon completion of the reaction, the cooling medium wataer was removed from the coils 8 and this section of pipe was heated to the melting point of magnesium chloride. In addition, the heating elements 12 surrounding the valve 11 were activated to heat this section of the discharge line and valve. The product molten suspension was then drained out line 16 by opening the valve 11 until the desired amount was obtained. The molten magnesium chloride and suspended titanium metal of the discharged portion were then separated by filtering out the desired particulate titanium metal onto a porous carbon plate (not shown).

Example II

Employing an apparatus of the type illustrated in Fig. II with the reactor having a 12 inch diameter and a height of 2 feet, about 95 lbs. of magnesium chloride and 17 lbs. of chip particles of titanium metal was charged thereto. The reaction vessel was closed from the atmosphere and purged of atmospheric contaminants by flowing an inert gas (argon) therethrough from the titanium tetrachloride inlet 21. The unit was then placed in a refractory enclosure provided with means for heating the vessel by fuel combustion or to act as a cooling chamber by forcing a flow of air through the chamber and around the vessel exterior. These procedures afforded means for controlling the temperature of the reaction system. The temperature of the magnesium chloride and titanium metal mixture was increased by the furnacing means until the magnesium chloride was molten and the reactor temperature was stabilized at about 850° C. The agitator 22 was then placed in operation to suspend the titanium particles.

Titanium tetrachloride was then added through inlet 21 at a rate of about 4¾ lbs. per minute after an initial starting-up period in which periods of ¼, ½ and ¾ of this rate were used to stabilize the operation. Soon after the start of the titanium tetrachloride addition, liquid magnesium was added through port 19, in a fine stream, at a rate of about 1.22 lbs. per minute, starting with an initial low rate of ¼ of the above, then ½, and then ¾ of this rate to stabilize the operation.

The run was continued for about 3 hours with the level of molten salt in the vessel being indicated by an electrical level gauge and controlled by removal of products through port 20. About 210 lbs. of particulate titanium and 860 lbs. of magnesium chloride were removed from the reactor through outlet 20. A sample of this particulate product was purified by removing magnesium chloride therefrom through vacuum distillation treatment. A sample of the purified product was melted in an arc furnace and was found to have a Brinell hardness number of 120, showing it to be of excellent quality and useful for all commercial applications of titanium metal.

Although described above as applied to particular embodiments the invention obviously is not restricted thereto. Thus, while particular reactor and reaction temperatures have been mentioned, use is contemplated of temperatures ranging from 720° C. to 1300° C. Similarly, the magnesium particles or droplets contemplated for use herein can be obtained through agitation, shotting, atomization, and reduction processes adapted to produce particulate magnesium, and from various commercial sources. The magnesium particles can be fed, as desired, into the molten salt reactant, either in molten or solid state. This reactant may also be added as a slurry of metal particles in a carrier fluid of molten salt. The size of the droplets or particles used, preferably ranges from between 100 mesh and ¼" in size, although with effective agitation larger particles or a continuous stream of molten magnesium can be dispersed into suitable size droplets into said molten salt. Alloying elements can be included in the magnesium reactant when titanium alloys are desired.

The common prior art titanium metal product comprises metal sponge consisting of an inter-connected massive structure usually firmly attached to the inner walls of the reaction vessel. The particulate product of this invention is distinctly different from this massive sponge and possesses many advantages due to these differences. It consists if independent lumps or bits of metal in such size that they can be readily removed from the reaction vessel through a suitable outlet or opening therein. Preferably, their size range is less than ½" and down to 100 mesh because of the more desirable behavior realized in subsequent processing steps, particularly leaching, but larger size particles can be obtained and may be desirably useful in other purification scheme.

In the present method one very important advantage lies in the ability to control the reaction temperature within limits because of the large volume and stabilizing influence of the molten salt. This molten salt acts as an efficient heat transfer agent and stabilizes the temperature conditions within the reaction system. Also, it is totally unnecessary in my process that large excess of reducing metal to be utilized such as prior processes require.

I claim as my invention:

1. A process for preparing titanium metal in particulate form which comprises initially reacting at temperatures ranging from 720° C. to 1300° C. in an inert atmosphere within a closed reactor titanium tetrachloride with particulate titanium metal suspended in molten magnesium chloride being circulated within said reactor, terminating addition of said tetrachloride reactant to the reactor upon production of a titanium subchloride having a chlorine to titanium atomic ratio between 2 and 3 inclusive admixed with said molten chloride, reacting the resulting titanium subchloride with an equivalent quantity of particulate magnesium metal suspended in said circulating magnesium chloride to produce particulate titanium metal and molten magnesium chloride, removing a portion of the products for recovery of particulate titanium metal therefrom, and utilizing the remainder of said particulate titanium metal containing products for the preparation of further quantities of titanium subchloride reactant by reaction with additional titanium tetrachloride subsequently introduced to said reactor.

2. A process for the preparation of particulate titanium metal which comprises oxidizing at temperatures ranging from about 750–850° C. in an inert atmosphere particulate titanium metal with titanium tetrachloride, effecting said oxidation in a closed reaction vessel wherein the particulate titanium metal is suspended in molten magnesium chloride being circulated within said vessel, terminating addition of the titanium tetrachloride reactant to said vessel upon production of a titanium subchloride having a chlorine to titanium atomic ratio of between 2 and 3 inclusive admixed with said molten magnesium chloride, reducing said titanium subchloride by reaction at temperatures from about 750–850° C. with an equivalent quantity of magnesium metal suspended in said circulating magnesium chloride to produce particulate titanium metal and by-product magnesium chloride, removing a portion of the resulting reaction products from said vessel and recovering particulate titanium metal therefrom, and recycling the remainder of said products to the titanium subchloride preparation step for reaction of its titanium metal content with titanium tetrachloride subsequently charged to said vessel.

3. A process for the preparation of particulate titanium metal which comprises oxidizing at temperatures ranging from about 750–850° C. in an inert atmosphere, particulate titanium metal with titanium tetrachloride, effecting said oxidation in a closed reaction vessel wherein the particulate titanium metal is suspended in molten magnesium chloride being circulated within said vessel, terminating addition of the titanium tetrachloride reactant to said vessel upon production of a titanium subchloride having a chlorine to titanium atomic ratio of between 2 and 3 inclusive in molten magnesium chloride, reducing said titanium subchloride by reaction at temperatures from about 750–850° C. with an equivalent quantity of particulate magnesium metal suspended in said circulating magnesium chloride to produce particulate titanium metal and by-product magnesium chloride, upon completion of the reduction removing about one-half the volume of the resulting reaction products from said vessel and recovering particulate titanium metal therefrom, and recycling the remainder of said products to the titanium subchloride preparation step of the process for reaction of its titanium metal content with additional titanium tetrachloride charged to said reaction vessel.

References Cited in the file of this patent

UNITED STATES PATENTS

| | | |
|---|---|---|
| 2,586,134 | Winter | Feb. 19, 1952 |
| 2,607,674 | Winter | Aug. 19, 1952 |
| 2,616,784 | Reimert | Nov. 4, 1952 |
| 2,647,820 | Jordan | Aug. 4, 1953 |
| 2,670,270 | Jordan | Feb. 23, 1954 |
| 2,706,153 | Glasser | Apr. 12, 1955 |
| 2,745,735 | Byrns | May 15, 1956 |

OTHER REFERENCES

Zeitschrift Fur Anorganische Und Allgemeine Chemie, vol. 234, 1934, pages 42–50.

Steel, vol. 127, No. 4, July 24, 1950, pages 63, 64 and 76.